(No Model.) 2 Sheets—Sheet 1.

E. C. MANNING.
GRAIN SEPARATOR.

No. 385,563. Patented July 3, 1888.

WITNESSES
INVENTOR (No Model.) 2 Sheets—Sheet 2.

E. C. MANNING.
GRAIN SEPARATOR.

No. 385,563. Patented July 3, 1888.

ATTEST.
Victor J. Evans.
James S. Smith.

INVENTOR.
E. C. Manning.
By H. A. Ennis, Atty.

UNITED STATES PATENT OFFICE.

EDWIN C. MANNING, OF WASHINGTON, DISTRICT OF COLUMBIA.

GRAIN-SEPARATOR.

SPECIFICATION forming part of Letters Patent No. 385,563, dated July 3, 1888.

Application filed December 14, 1887. Serial No. 257,901. (No model.)

*To all whom it may concern:*

Be it known that I, EDWIN C. MANNING, a citizen of the United States, residing at Washington, in the District of Columbia, have invented certain new and useful Improvements in Grain-Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in a novel means for separating grain from the straw.

My invention consists, essentially, of a series of shaking frames, forming a conveyer for the straw and connected to each other and to a reciprocating pan beneath them by pairs of pivoted angle-arms, for the purpose of counterbalancing the shaking-frame, as the sections and pan are reciprocated alternately in opposite directions, for the purpose of feeding, opening, and agitating the straw to effect the separation of the grain therefrom.

The invention also consists in certain peculiar and novel features of construction and arrangement, as hereinafter described and claimed.

Figure 1:
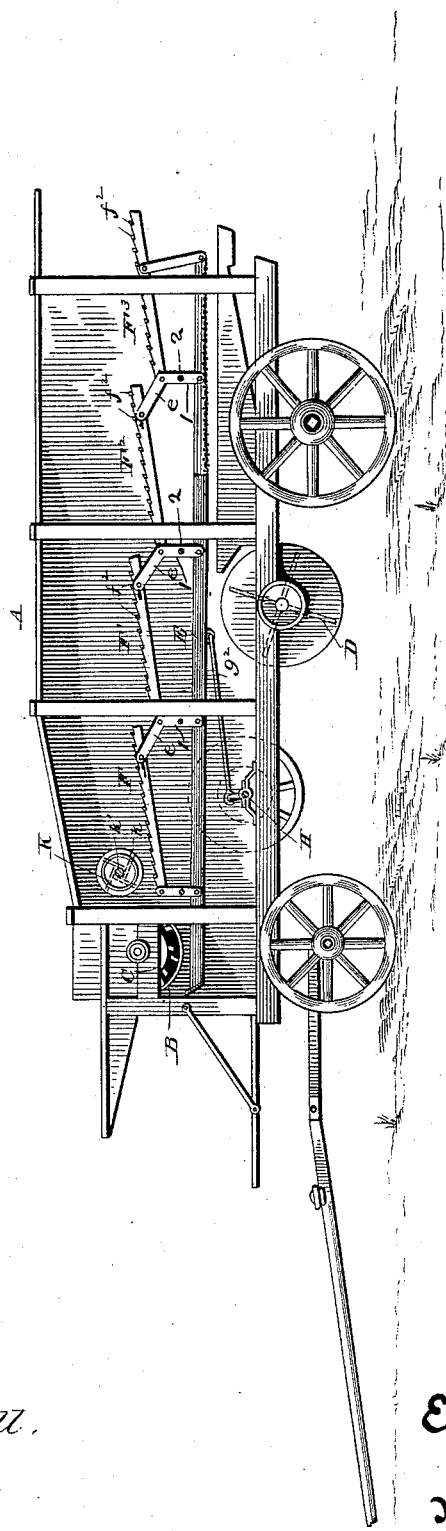
Figure 2:
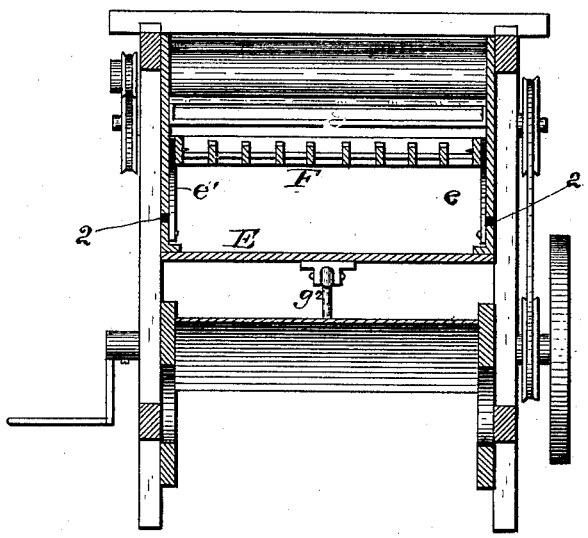
Figure 3:
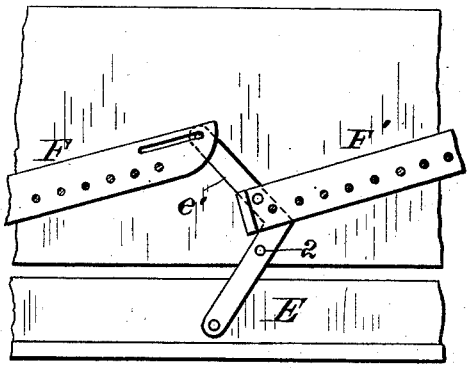

In the annexed drawings, Figure 1 is a side elevation of a thrashing-machine, part of the casing or frame of which is removed to expose the internal mechanism. Fig. 2 is a vertical cross-section through the same, showing a pair of angle-levers as they appear while supporting the shaking-table. Fig. 3 is an enlarged view showing two of the straw-shakers pivoted to an angle-lever.

Referring by letter to the accompanying drawings, A designates the frame or casing of a thrashing-machine, in the forward part of which is placed the concave B and the thrashing-cylinder C, of the usual or any preferred form, and in the lower portion of which is placed the blast-fan D, for separating the chaff from the grain. In the lower portion of the casing is placed the pan E, which is pivoted to the lower ends of a series of angle-arms, $e$, arranged in pairs at opposite sides of the pan, and pivoted, through the lower arms, 1, of said angle-arms, to the sides of the casing by transverse pivots or fulcra 2, while the upper ends of said arms are pivoted to the sides of the shaking-frames or straw-shakers. Considerable space is left above the straw-shakers, in order that the straw may not be obstructed in its passage from the thrashing-cylinder to the discharge end of the machine.

The straw-shakers F F' F² F³ are each composed of side pieces connected by slats $f^2$, placed at suitable distances apart. The ends of the shaking-frames practically abut when the sections are in the same horizontal plane, so as to form a continuous support for the straw.

The swinging movement required is imparted to the pan E by a bar, $g^2$, pivoted at its rear end to the under side of the pan and connected at its front end to a crank-shaft, H. The shaking-frames move together in one direction, while the pan E moves in the opposite direction and serves as a counter-balance to said shaking-frames, thereby rendering their action uniform and easy.

Immediately in front of the cylinder C is placed a beater, K, consisting, preferably, of radial floats $k$, attached to a shaft, $k'$, said shaft being properly journaled in the frame A and driven by suitable belting. After the grain has been thrashed by the cylinder C it is thrown upon the shakers F F' F² F³ by the beater K. These shakers rise and fall at their ends and are moved backward and forward alternately simultaneously, so as to lift and drop the straw and thoroughly open the same while feeding it out of the machine, thus entirely separating the grain from the straw. The alternate rising and falling and reciprocating motions of the slatted shakers not only produce the described undulations of the straw, but also roll or agitate the same, so as to insure the discharge of all of the grain.

Having thus fully described my invention, what I claim, and desire to secure by Letters Patent of the United States, is—

1. In a straw-shaker, the combination of the main frame, the angle-levers pivoted thereto through their lower arms, a series of shaking frames or sections each supported pivotally at the apices of one pair of levers and connected pivotally to the upper ends of the upper arms of the succeeding pair of angle-levers, similarly pivoted to the sides of the casing, and a reciprocating pan connected pivotally to the angle-levers and serving as a counter-balance for the shaking-frames, substantially as specified.

2. The combination, with the main frame, the shaking-frames, the pivoted angle-levers, each pair connected to the adjacent ends of two frames, as described, and the counterbalancing-pan pivoted to the lower arms of said angle-levers, of the crank-shaft, and rod connecting said crank-shaft to the counterbalancing-pan, substantially as described.

3. The combination, in a thrashing-machine, of a series of inclined straw-shakers, a series of pairs of obtuse angular levers pivoted to the sides of the main frame, the upper arms of said levers pivoted to the highest ends of straw-shakers, with a pan, E, pivoted to the lower arms of the said levers, the fulcra of the said levers located below the pivotal points of the shakers, substantially as described.

In testimony whereof I affix my signature in presence of two witnesses.

EDWIN C. MANNING.

Witnesses:
  THEO. MUNGEN,
  H. J. ENNIS.